Jan. 7, 1941. J. AUGENBLICK 2,227,420
ADJUSTABLE CONNECTION FOR FISHHOOKS
Filed Nov. 18, 1939 2 Sheets-Sheet 1
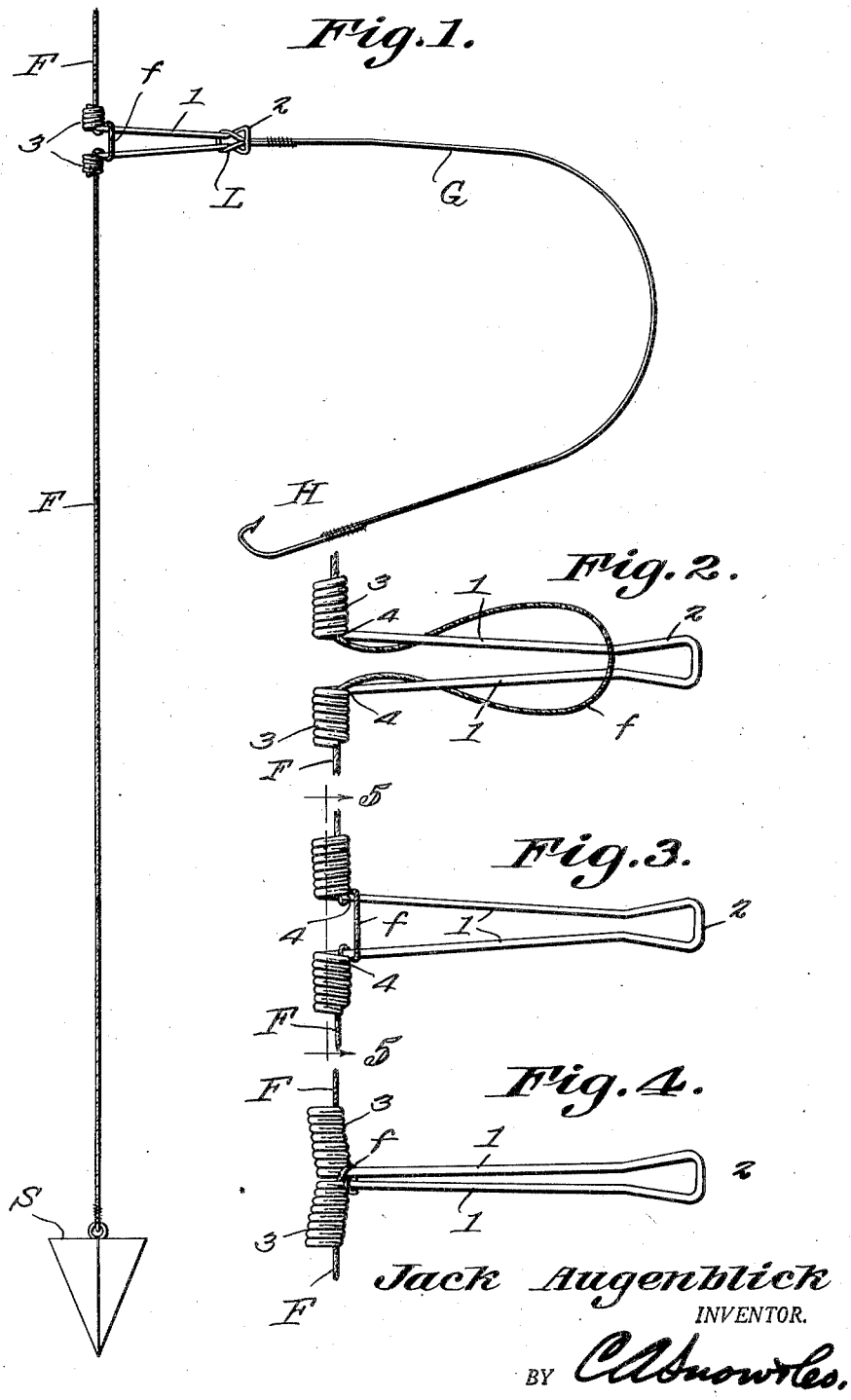
Jack Augenblick
INVENTOR.
BY CKnowles,
ATTORNEYS.

Jan. 7, 1941. J. AUGENBLICK 2,227,420
ADJUSTABLE CONNECTION FOR FISHHOOKS
Filed Nov. 18, 1939 2 Sheets-Sheet 2
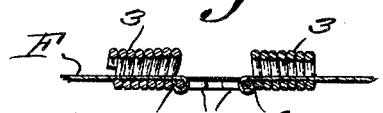
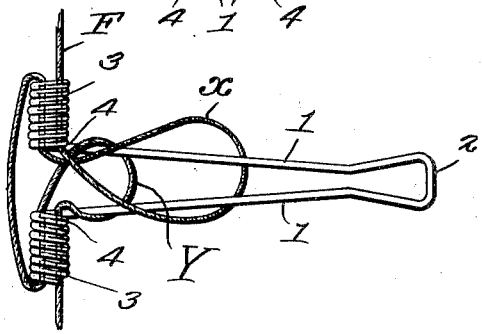
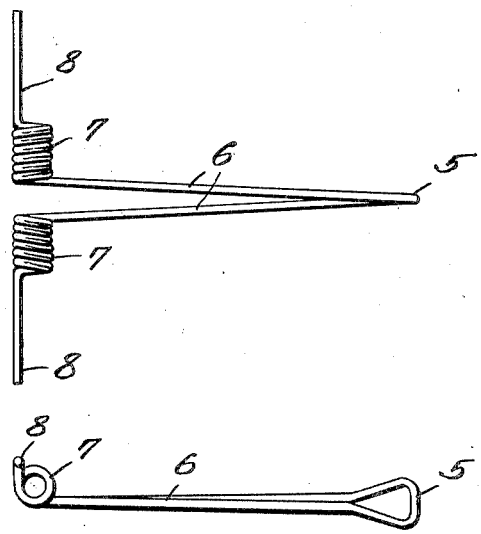
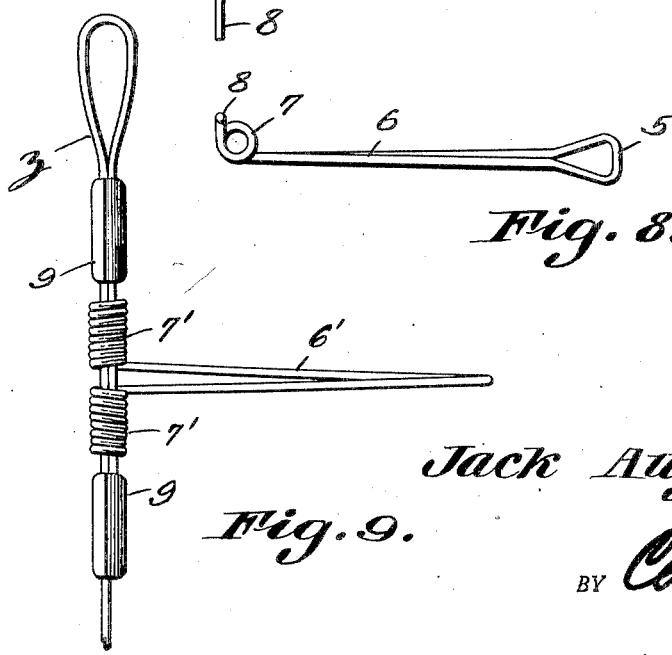
Jack Augenblick
INVENTOR.
BY
ATTORNEYS.

Patented Jan. 7, 1941

2,227,420

UNITED STATES PATENT OFFICE 2,227,420

ADJUSTABLE CONNECTION FOR FISHHOOKS

Jack Augenblick, Atlantic City, N. J.

Application November 18, 1939, Serial No. 305,189

5 Claims. (Cl. 43—28)

This invention relates to a device for use in attaching fishhooks adjustably to a line without the necessity of cutting and tying the line.

A further object is to provide a connecting device which can be adjusted readily along the line but, after being so adjusted, will be held securely in place so as not to shift when subjected to a pull through the fishhook.

A still further object is to provide a hook-contacting means which is simple and inexpensive in construction and constitutes a cushioning means between the hook and the line whereby the pull on the line is eased when a fish strikes the hook.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is an elevation of a portion of a line showing a hook connected thereto by the attaching means constituting the present invention.

Figure 2 is an elevation of the attaching device and showing the position of the line thereon during the first stage of securing said device to the line following adjustment.

Figure 3 is a similar view showing the second stage of fastening the device against movement on the line.

Figure 4 is a similar view showing the device securely fastened to the line so as to be held against movement therealong.

Figure 5 is a section on line 5—5, Figure 3.

Figure 6 is an elevation showing portions of the line so looped in engagement with the attaching device as to hold the device adjustably to the line without the necessity of threading the line through the device in the manner suggested in Figs. 1 to 4.

Figure 7 is an elevation of a slightly modified form of the attaching device.

Figure 8 is a plan view thereof.

Figure 9 is a side elevation showing a modified means for holding the device attached to a fishing line leader made of gut or wire.

Referring to the figures by characters of reference, 1 designates the diverging arms of an elongated yoke formed of spring material, such as brass wire, these arms being joined at one end by an open loop or head 2 the sides of which converge toward and merge into the arms 1, this head, in the structure shown in Figures 1 to 6 inclusive being positioned in the same plane with the arms 1 and being substantially angular.

Those ends of the arms remote from the head merge into the inner convolutions of oppositely extended spring coils 3, said arms and the inner coils of the convolutions cooperating to form expansible crotches 4.

In using the device the loop L ordinarily found at one end of the gut G to which a fishhook H is attached is placed over the coils 3 and arms 1 so as to straddle the arms and extend outwardly from within the head 2, as shown in Figure 1. The fishing line F which carries the sinker S is threaded longitudinally through the coils 3 and that portion of the line between the coils is left slack so as to form a large loop $f$ which, as shown in Figure 2, is brought into position around the arms 1. This can be done either before the gut G is attached to the device or subsequently thereto. The connecting device is then slid along the line F to the desired position after which those portions of the line F extending in opposite directions from the device are pulled taut. This will result in the loop $f$ being contracted, as shown in Figure 3 and this contraction will continue until the loop has been drawn tightly about the arms 1 pulling the arms together and substantially closing the gap between the coils. As a result of this action portions of the line F will wedge into the crotches 4 and the knot thus formed will serve to hold the device against sliding movement along the line, as will be obvious.

By loosening the loop $f$ from the position shown in Figure 4 until it is restored to the positions shown in Figures 2 and 3, the device can be shifted along the line F until brought to any other desired position whereupon, by pulling the ends of the line in opposite directions the device will again be contracted and the parts restored to the positions shown in Figure 4.

Obviously the means for connecting the line to the device heretofore described necessitates the insertion of the line longitudinally through the coils 3 before the line is looped about the arms 1 and head 2. If desired, however, the device can be attached to the line without the necessity of threading the line through the coils in this manner. As shown in Fig. 6 a loop $x$ can be formed in the line and this loop inserted through one of the coils 3 and then around head 2 and arms 1. Another loop Y can be formed in the line also and can be inserted through the other coil 3 and then looped over the head 2 and arms 1. By then pulling the line F in opposite directions away from the attaching device, the two loops x and Y will be drawn tightly about the arms 1, pulling these arms together and causing portions of the line to become wedged within the crotches 4. By loosening the loops the device can be moved to any other desired position on the line after which the loops can be tightened to hold the device in place.

Instead of providing a head 2 which is supported in the same plane with the arms 1, a twist can be given to the arms so that the head portion 5 will be located substantially at right angles to the plane occupied by the arms 6, as shown in Figures 7 and 8. Also, as shown in these figures, the coils 7 can be provided with oppositely projecting fingers 8 merging into the outer convolutions of the coils and these fingers can be held to a line by means of suitable clamps whereby the device will be held against displacement along the line after it has been brought to proper position. Clamps which can be used for this purpose have been illustrated in Figure 9 where they are employed, as at 9, for holding together the strands of a loop z formed by one end portion of the line and are spaced apart sufficient distances to hold the attaching device against displacement relative to the line. The device shown in Figure 9 is similar to that shown in Figures 7 and 8 with the exception that the fingers 8 have been eliminated. Obviously, however, these fingers could be extended into the clamps 9 so as to be held to the line thereby, the arms 6' corresponding with the arms 6 and the coils 7' corresponding with the coils 7.

In every case the looped gut extending from the fishhook is applied to the attaching device as already explained and as shown in Figure 1. Thus the hook will be held in proper position relative to the line and it is free to swing around the line without causing the line to become twisted or tangled. Furthermore the oppositely extending coils constitute cushioning springs so that should the arms 1 be pulled downwardly, for example, in Figure 1, these springs would exert a cushioning action on the line and relieve it from abrupt strains to which it would be subjected should there be an unyielding connection at this point.

What is claimed is:

1. A device for attaching a fishhook to a line, including spring arms connected at one end by an integral head, said head and arms constituting means for engagement by the looped end of a gut carrying a fishhook, oppositely extending coils at the other ends of the arms, each coil cooperating with its arm to provide a line-gripping crotch, said coils being positioned for the reception of a line having a loop between the coils and said arms being positioned to be embraced by said loops.

2. A device for attaching a fishhook to a line, including resilient arms connected at one end for engagement by the gut of a fishhook, and oppositely extending cushioning coils projecting from the other ends of the respective arms for the reception of the line.

3. The combination with a fishing line, of a connecting device including resilient arms joined at one end, oppositely extending cushioning coils on the arms at the other end, said line being extended to the coils and having a loop between the coils and embracing the arms, each coil and its arm cooperating to provide a line-gripping crotch, the line when pulled taut, constituting means for drawing the arms together and for wedging into the crotches.

4. The combination with a fishing line, of means adjustably mounted thereon for connecting a fishhook thereto, said means including resilient arms connected at one end for attachment to a fishhook, an oppositely extending coils at the other end of the arms, said coils being resilient and integral with the arms, said line having spaced loops extended through the respective coils and positioned oppositely to each other about the arms, said line, when drawn taut, constituting means for tightening the loops about the arms to draw the arms and coils toward each other, each coil and its arm cooperating to provide a line-receiving crotch.

5. The combination with a fishing line, of means for connecting a fishhook thereto including resilient arms connected at one end for attachment to a hook, oppositely extending cushioning coils integral with the respective arms and mounted on the line, and means for holding the coils to the line and against displacement relative thereto.

JACK AUGENBLICK.